United States Patent Office 3,485,822
Patented Dec. 23, 1969

3,485,822
2,4,6-TRI-(EPSILON-CAPROIMIDO)
SYM. TRIAZINE
Edward W. Pietrusza, Morris Township, Morris County, N.J. (36 Fairmount Ave., Morristown, N.J. 07960), and Rudolph Pinter, 24 Pine St., and Jack R. Pedersen, 25 Prospect St., both of Morristown, N.J. 07960
No Drawing. Original application Oct. 20, 1961, Ser. No. 146,449. Divided and this application Nov. 7, 1968, Ser. No. 794,446
Int. Cl. C07d 55/24
U.S. Cl. 260—239.3                              1 Claim

ABSTRACT OF THE DISCLOSURE

This invention is a new chemical compound, 2,4,6-tri-(epsilon-caproimido) sym. triazine. This compound is useful as an intermediate and promoter in the preparation of polyamides.

CROSS REFERENCE TO RELATED APPLICATION

This application is a division of copending application Ser. No. 146,449, filed Oct. 20, 1961.

This invention relates to the preparation of solid, linear polyamides of high molecular weight. More particularly this invention relates to solid polymers of $\epsilon$-caprolactam of high molecular weight and to a process for the production of said polymers.

Many processes have been proposed in the past for the preparation of solid polymers of lactams such as $\epsilon$-caprolactam. These processes have been based either upon the hydrolytic polymerization of the lactam in the presence of water usually together with an acidic or basic catalyst; or upon the anionic polymerization of the lactam under anhydrous conditions in the presence of a metal salt of the lactam, such as formed by action on the lactam of an alkali metal or alkaline earth metal, or alkaline-reacting compound thereof as the catalytic agent.

A disadvantage of these prior art processes is the necessity of conducting said processes at relatively high temperatures; e.g. for caprolactam temperatures in excess of the polymer softening point of about 205°–225° C. are required in order to obtain a satisfactory rate and degree of polymerization of $\epsilon$-caprolactam. It is well known that chemical equilibrium exists between caprolactam and the polymer produced therefrom. Those polymeric products formed by the above-mentioned prior art processes generally contained about 10 percent monomeric material. Consequently in order to obtain a polyamide possessing suitable physical properties it was frequently necessary to resort to extensive purification operations in order to remove the undesirable monomeric units present in the poly-$\epsilon$-caprolactam.

Furthermore, the molecular weight of the polyamide produced by these prior art processes was relatively low, i.e. the polymeric products exhibit a maximum reduced viscosity in 0.5 weight percent m-cresol solution of about 3.5, which represents a weight average molecular weight of the order of 100,000.

In addition, to transform polycaproamide as above produced into molded shapes, it was necessary to heat said lactam to a temperature in excess of its melting point to prepare the desired fabricated shapes by extrusion or injection technique. The polycaproamide melt, however, is extremely viscous and is consequently not conveniently usable for the preparation of intricate shaped objects of substantial size. Moreover, the above cited polyamides possess a tendency to darken in air at elevated temperatures commonly employed in said molding and extrusion operations. Such darkening has been attributed to oxidative attack upon the primary amino end groups found in these polyamides.

More recently it has been recognized that under anionic polymerization conditions, i.e. under base-catalyzed anhydrous conditions (wherein a lactam salt of a metal, e.g. of an alkali metal or alkaline earth metal, is used as catalyst) the polymerization of lactams proceeds by a chain reaction starting from metal salt of the lactam, and (1) adding this metal salt to a lactam molecule with accompanying cleavage of the lactam ring; (2) regenerating the metal sale of the lactam; and (3) continuing the sequence of addition and regeneration:

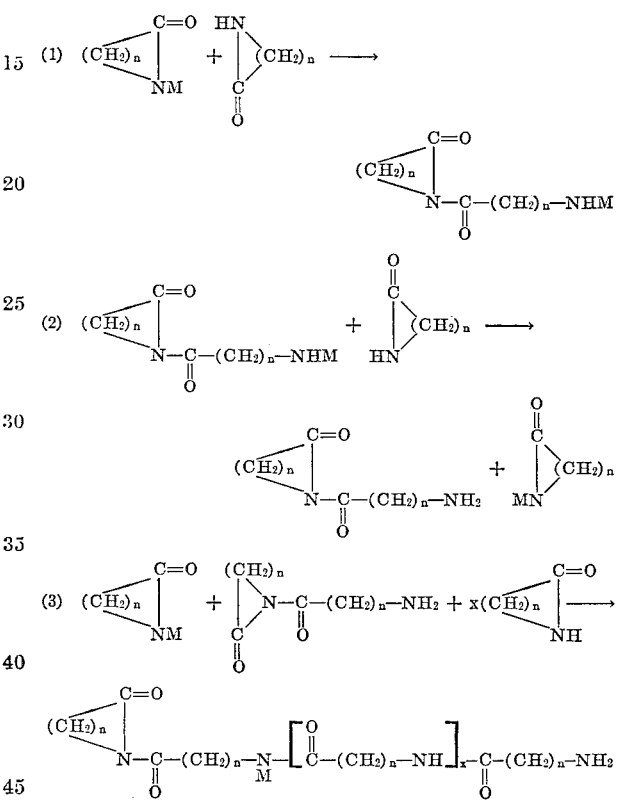

Moreover it has been recognized that step (1) above formulated is the step requiring the greatest energy, so that if an N-acyl lactam is added to the initial reaction mixture, the reaction can immediately proceed as at step (3) above formulated, and can proceed readily at temperatures below the softening point of the polyamide product.

We have discovered that promotion of the polymerization of a lactam such as $\epsilon$-caprolactam, having at least 7 atoms in the lactam ring, results under anionic polymerization conditions when an N-(2-sym. triazino) lactam is provided in the polymerization reaction mixture; and that the resulting polymers have triazino end groups.

The N-(2-sym. triazino) lactam can be prepared e.g. in solution or colloidal dispersion in the lactam, by heating in lactam as diluent a metal salt of the lactam and a triazine which bears on at least one of its ring carbon atoms a replaceable substituent, i.e. a substituent attached by a more electronegative atom than the nitrogen atom of the lactam, whereby the metal forms a salt with said substituent and the lactam residue replaces said substituent. Readily replaceable substituents include halogen atoms and substituents attached to the triazine ring by an oxygen atom. Illustrative of readily replaceable substituents as above defined are: chloro, alkoxy, aryloxy, arylalkoxy, and cycloalkoxy. Mono- and di-alkylamino, mono- and di-arylamino, mono- and di-arylalkylamino, mono- and di-cycloalkylamino and hydroxy substituents are further illustrative of replaceable substituents which are of interest in our invention.

Illustrative examples of sym. triazine derivatives suitable as starting materials for reaction with lactam salts to form the promoters of our invention are:

2,4,6-trichloro-s-triazine,
2,4,6-tribromo-s-triazine,
2,4-diiodo-6-chloro-s-triazine,
2,4-difluoro-6-chloro-s-triazine,
2,4,6-trihydroxy-s-triazine (cyanuric acid),
2,4-dichloro-6-hexoxy-s-triazine,
2,4-dimethoxy-6-chloro-s-triazine,
2,4-diphenoxy-6-chloro-s-triazine,
2,4-dicyclohexyl-6-bromo-s-triazine,
2-benzyl-4,6-dicholor-s-triazine,
2,4,6-tri(methylamino)-s-triazine,
2-cholor-4,6-di(diisopropylamino)-s-triazine,
2-cholor-4,6-di(benzylamino)-s-triazine,
2-chloro-4,6-di(cyclohexylamino)-s-triazine,
metal salts of cyanuric acid,
2-cholor-4,6-di(phenylamino)-s-triazine,
2-bromo-s-triazine,
2-cholor-4,6-di(di-t-butyl-phenoxy)-s-triazine,
2,4,6-triphenoxy-s-triazine,
2,4,6-trimethoxy-s-triazine,
2,4,6-trihexoxy-s-triazine,
2,4,6-tribenzyloxy-s-triazine,
2,4,6-tri(dimethylamino)-s-triazine,
2,4,6-tri(diphenylamino)-s-triazine,
2,4,6-tri(benzylamino)-s-triazine,
2-butyl-4-chloro-6-methoxy-s-triazine,
2-methyl-4-cholor-6-decyloxy-s-triazine,
2-decyl-4-bromo-6-benzylamino-s-triazine,
2,4-dibutyl-6-chloro-s-triazine,
2-hydroxy-4-cyclohexyl-6-chloro-s-triazine,
2,4-diamino-6-chloro-s-triazine,
2-trichloromethyl-4-phenoxy-6-phenyl-s-triazine,
2,4-diphenyl-6-chloro-s-triazine.

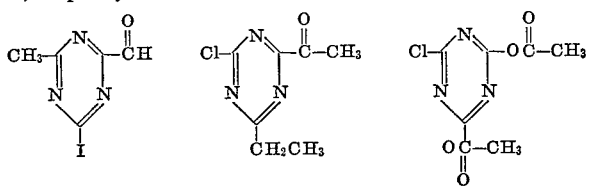

s-triazine with azo compound substituents, e.g.:

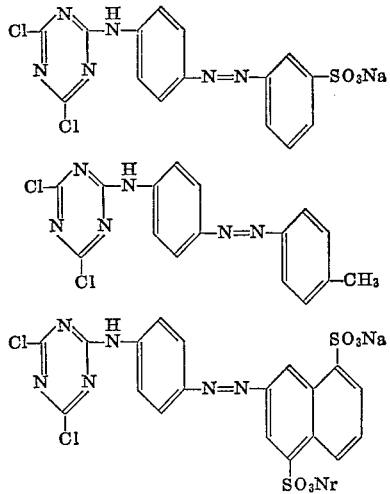

The N-(2-sym, triazino) lactam promoters used in our process are conveniently prepared by heating with a lactam metal salt which has been formed in situ in the lactam. Our promoters can also, for example, be prepared from lactam metal salts formed in an inert diluent such as benzene, etc. from which the promoter can be isolated if desired.

Moreover it is not necessary to employ a lactam salt in the preparation of the promoters. Thus when using a triazine containing at least one readily replaceable substituent forming an acidic or volatile compound by addition of a proton, such as chloro, methoxy, etc. substituents on at least one ring carbon atom of the triazine, the triazino lactam can be prepared simply by heating the chloro or methoxy substituted triazine and excess lactam together, while removing the product of metathesis such as hydrogen chloride or methanol via salt formation with the lactam and/or volatilization. Water in the lactam can be distilled out either during this procedure for preparing our promoters directly from lactams, or subsequently to their preparation by this or other procedures. A particular advantage of our promoters over others which have been proposed is the stability of our triazino lactams to hydrolysis during drying by distillation of a solution or dispersion thereof in lactam.

The interaction of an alkali or alkaline earth metal or alkaline-reacting compound thereof with ε-caprolactam to form a lactam salt is illustrated by Equation 1:

(1)

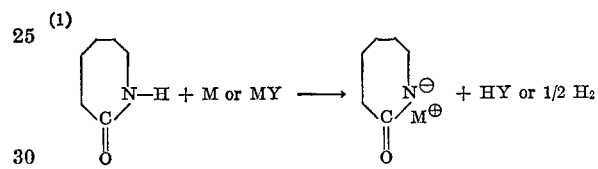

wherein M is an alkali or alkaline earth metal in particular lithium, sodium, potassium, ribidium, cesium, calcium or magnesium, said metal being in the cation form when combined with Y; and Y is an anion, in particular: hydride, hydroxide, carbonate, amide, oxide, anion of a weak acid e.g. as shown in Chemical Abstracts, volume 52 of 1958 at column 12529e, and carbanion derived by removal of a proton from such hydrocarbon species as alkanes, cycloalkanes, arylalkanes and benzenoids. Particular illustrative examples of the carbanions are: $CH_3^\ominus$, $CH_3CH_2CH_2CH_2^\ominus$

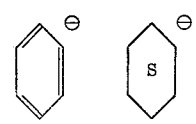

and

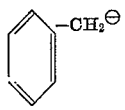

Our process in the discussion and examples which follow will be specifically illustrated by reference to use therein of lithium hydride and e-caprolactam. It is to be understood that these specific compounds and the conditions cited for use therewith are illustrative rather than limiting; and that the same principles and broadly the same modes of operation apply when using the other metals and metal compounds above defined and when using other lactams to form our triazino lactam promoters including in particular 2-pyrrolidone, 2-piperidone, enanthic lactam, omega-caprylic lactam, and their homologs.

The addition of one of the above cited s-triazines containing at least one replaceable substituent to the reaction mixture produced by the process illustrated in Equation 1 results in the rapid interaction of said s-triazine in the reaction mixture to form, in situ, an N-s-triazino-ε-caprolactam. The process whereby this is believed to occur is depicted by Equation 2 using epsilon-caprolactam for purposes of illustration:

(2)

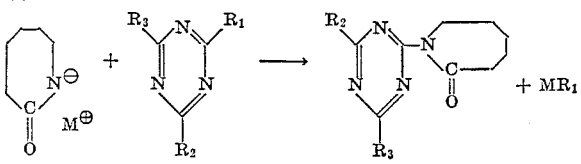

wherein M is a metal and at least $R_1$ is a replaceable substituent as above defined. If $R_2$ and $R_3$ are also replaceable substituents they will in general be replaced like $R_1$ on reaction with e.g. caprolactam lithium salt, forming the specific new compound 2,4,6-tri-(epsiloncaproimido) sym. triazine of formula:

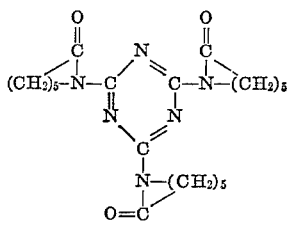

The overall process occurring in our polymerization is illustrated by Equation 3 for caprolactam:

(3)

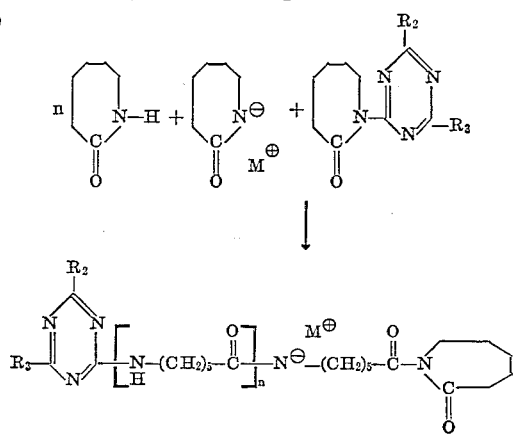

wherein $n$ is an integer ranging typically from $1 \times 10^3$ to $1 \times 10^4$. It will be noted that the polyamide formed in our process is attached in place of the replaceable substituent $R_1$ to the triazino group. In those instances wherein the s-triazine employed contains 2 or 3 readily replaceable substituents, polyamides of the following formulas having triazino end groups are respectively obtained as the main polymer product:

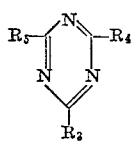

and

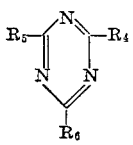

wherein $R_4$, $R_5$ and $R_6$ are polyamide chains. Sizable proportions of triazine with 2 or 3 readily replaceable substituents appear to partially cross-link the insolubilize the final polymers, perhaps by reaction with metal in the primary polymer product, e.g. in a product as shown in Equation 3.

Inasmuch as an N-s-triazino-ε-caprolactam must interact with metal-ε-caprolactam to initiate the polymerization process, it is necessary that ε-caprolactam metal salt remain present after the in situ formation of an N-s-triazino-ε-caprolactam. Accordingly in the above reaction mixtures a ratio of equivalent weights of metal in the lactam salt: equivalent weights of replaceable substituents in the triazine of at least about 1.1:1 is used. The triazino compound employed most commonly has 3 readily replaceable substituents such as chloro, methoxy or phenoxy; in such instances preferred ratios of atom equivalents of metal: molecular equivalents of triazino compound are from about 6:1 to about 30:1. At much lower ratios the reaction may be quite slow and uncertain because of the magnified effect of impurities reactive with the metal.

The proportion of the trichloro and like triazines used, based on lactam, affects the solubility of the polymer product as above noted. Relatively large proportions result in a final product at least partially insoluble in e.g. meta-cresol. Soluble polymers of reduced viscosity in 0.5% solution in metal-cresol at 25° C. of about 3.5–15 can readily be obtained using e.g. about 0.05–0.1 mol of cyanuric chloride and about 0.3–1 mol of lithium hydride per 100 mols of caprolactam.

The equivalent weights of metal in the initial reaction mixture per 100 equivalents of lactam used therein can range from about 0.1 to about 10, preferably however ranging from about 0.3 to about 2.0 per 100 equvalents of lactam.

As above indicated, hydroxy triazines can be used to form promoters in our process. However the hydroxy triazines are less rapidly reactive than the corresponding chloro, methoxy, phenoxy, etc. triazines with lactam metal salt, so that polymerization of e.g. caprolactam to the gel stage at 160°–180° C. in presence of e.g. lactam lithium salt catalyst and cyanuric acid may require say 2 hours versus a few minutes when cyanuric chloride is used as in Example 1 below. For some purposes this lower rate of polymerization is an advantage since it allows more time to manipulate the partially polymerized reaction mixture at any particular stage of polymerization, e.g. to form foamed products, extruded articles, etc.

In accordance with a typical preferred mode of carrying out our polymerization process, a catalyst containing an alkali metal or an alkaline earth metal is admixed under anhydrous conditions with ε-caprolactam to form a reaction mixture comprising from about 0.1 to about 10 gram equivalents of the metal per 100 gram equivalents of lactam. The temperature of the mixture is elevated to about 90–130° C. to effect complete interaction of said catalyst with an equivalent quantity of ε-caprolactam. The reaction mixture thus produced is efficiently agitated and then maintained at a temperature of about 160–180° C., and a sym. triazine substituted on at least one ring carbon by a chloro, methoxy, or phenoxy group is added thereto in an amount such that the ratio of equivalent weights of metal in the reaction mixture to replaceable substituents in said s-triazine lies within the range from about 2:1 to about 10:1.

Our process is conducted with the lactam monomer in liquid state. Reaction temperatures especially suitable for the polymerization of ε-caprolactam by our process range from about 140° C. to about 215° C. It is particularly convenient to perform said polymerization process at temperatures not above about 200° C., preferably within the range from about 160° C. to 180° C.

It is necessary that the polymerization process as disclosed herein be conducted under substantially anhydrous conditions. Those compounds which are capable of functioning as proton donors, exclusive of hydroxy substituted derivatives of s-triazine, are to be excluded from the reaction mixture. Hence, the presence of such compounds as mineral acids and water is to be avoided inasmuch as these compounds readily interact with the metal-organic species present in the reaction mixture and inactivate said species for further polymerization by replacing the metallic cation moiety of said species with a proton. The quantity of water and/or proton donating species should be kept at a minium, preferably less than about 50 p.p.m.

Although the polymerization process is preferably conducted by adding a halogen substituted s-triazine to a reaction mixture containing metal caprolactam and ε-caprolactam, a reverse procedure may be utilized if desired, i.e. an s-triazine may be added to the bulk caprolactam, and the alkali or alkaline earth metal containing catalyst may be added thereafter. Alternatively, if desired, it is possible to add the s-triazine derivative simultaneously with the alkali or alkaline earth metal catalyst to the ε-caprolactam.

Although the metal-ε-caprolactam is preferably prepared in situ immediately prior to its utilization in the polymerization process, the preparation of said metal-ε-caprolactom may be made at a time prior to the polymerization process and stored, if desired. A mixture of said metal compound and ε-caprolactam has been found to be stable at temperatures of 20–25° C. for a period of at least one month. Even at higher temperatures, e.g. 90° C., the time of stability is about 4 days.

By utilization of an s-triazine derivative in conjunction with an alkali or alkaline earth metal catalyst in accordance with our invention one is able to obtain a high rate of polymerization of ε-caprolactam as well as a high conversion to polymer at temperatures considerably below the melting point of poly-ε-caprolactam, i.e. at temperatures less than 215° C. At such temperatures the equilibrium is highly favorable toward polycaproamide versus monomer. Hence one is able to obtain at least 95 percent monomer conversion. Such degree of monomer conversion is highly desirable in that removal of residual monomer from the polymer obtained is unnecessary.

Moreover polycaproamide can readily be prepared by the process of our invention with molecular weight considerably higher than usually achieved by the conventional processes. Polyamide showing reduced viscosity in m-cresol at 25° C. and 0.5 gram per 100 cc. concentration up to as high as about 15 can readily be produced by our process, representing molecular weights of the order of 500,000 and above. Such high molecular weight materials possess greater tensile strength and toughness than those products of lower molecular weight which have heretofore been prepared, especially at elevated temperatures such as 210° C. This high temperature stability may be connected with high crystallinity of our polymers (about 40%) and/or with our triazino end group terminating 1-3 polyamide chains as above discussed in connection with Equation 3.

In addition, the rapid polymerization of the relatively fluid monomer to solid polymer made possible by our process allows production of polycaproamide articles directly from ε-caprolactam in molds including molds of intricate design.

A further advantage is that various filler materials such as sand, pigments, blowing agents and, if desirable, polycaproamide product o four process. These materials plasticizers, can be readily incorporated in the polycaproamide product of our process. These materials can be homogeneously admixed with monomeric ε-caprolactam which can then be converted by our process to a filled polycaproamide. Such operations provide uniform distribution of the filler throughout the resulting polymer.

Still another advantage is that the polycaproamides of our invention contain in place of the usual primary amino end groups, s-triazine groups which can be devoid of primary amino substituents. Our polycaproamides containing end groups from cyanuric chloride, for example, display considerable stability to oxidation as will be evident from the data below.

The presence of an s-triazine derivative as end group in our polycaproamide permits the inclusion of various substituents into said group having significant effect upon the physical and/or chemical properties of the polyamide product. Thus, the presence of a chromophoric substituent, as in the s-triazine having azo compound substituents illustrated above will result in a colored polyamide in which the dye will be part of the molecular structure and hence non-extractable. Similarly, long chain aliphatic groups as substituents in the s-triazine nucleus will confer a degree of lubricity and of compatibility with plasticizers, etc. upon the polymer. Antioxidant groups such as a di-t-butyl phenoxy as above illustrated can likewise be incorporated as a permanent part of the polymer structure. Moreover, the presence of such aliphatic groups will impart some degree of hydrophobicity to the polyamide thus making it less susceptible to deformation and hydrolytic attack.

The following specific examples further illustrate our invention wherein temperatures are in degrees centigrade.

EXAMPLE 1

Caprolactam containing less than 50 p.p.m. water was prepared by flash distilling caprolactam at 100–115° under absolute pressure of 3–5 mm. Hg. The dried caprolactam thus obtained was admixed at 110° C. with lithium hydride under anhydrous conditions in proportions of 1.44 mol lithium hydride per 100 mols of caprolactam. The resulting mixture was charged to a reactor under anhydrous conditions, and then heated to 160° for a period of 1.5 hours under a dry nitrogen blanket to produce a dispersion of 1.44 mol percent of lithium caprolactam salt in caprolactam monomer. This dispersion was constantly agitated with a mechanical stirrer and 2,4,6-trichloro-s-triazine (cyanuric chloride) was added thereto in proportions of 0.12 mol per 100 mols of caprolactam. The reaction mixture was agitated and warmed to 180°. Polymerization of caprolactam to a thick gel was visually observable within 3 minutes, and practically complete conversion to solid polycaproamide was evident within 45 minutes. The reaction mixture was permitted to remain at 180° for an additional 2.25 hours and then cooled to ambient temperature (ca. 25°). The solid mass thus obtained was ground to 20 mesh particle size, extracted for 3 hours with 50 volumes of boiling water, and then dried at 55° under 1 mm. Hg pressure for 24 hours. The polycaprolactam thereby obtained possessed a melting point of 225°, and a reduced viscosity of 6.8 in 0.5 percent m-cresol solution at 25°.

The presence of an s-triazine nucleus in the polyamide thus produced was confirmed by examination of the ultraviolet spectrum of said polyamide. It was discovered that the carbonyl group of the amide linkage absorbed ultraviolet light at about 217 m$\mu$, precisely the same region as that at which triazine nuclei also absorb ultraviolet light. Consequently in order to demonstrate the presence of s-triazine groups in the polyamide molecule it was discovered that solution of equal concentration, (0.2418 g. in 50 ml. concentrated $H_2SO_4$ at 25°) of polyamide, could be compared simultaneously via utilization of a twin beam Beckman spectrophotometer model DK–1, wherein one beam was passed through a polyamide sample prepared by the prior art procedures and the other beam was passed through the sample herein prepared. By such a means the absorptive effects of the carbonyl bonds of both polymers cancel one another out, and the absorptive peak obtained is due solely to the presence of the s-triazine group.

The results obtained are illustrated in Table I:

TABLE I

| Sample 1 | Sample 2 | Optical density at 217 m$\mu$ |
|---|---|---|
| Polyamide control [a] | Polyamide control [a] | 0.000 |
| Do | s-Triazine polyamide [b] | 0.370 |

[a] Polyamide prepared by hydrolytic polymerization of ε-caprolactam.
[b] Polyamide prepared by process of Example 1.

EXAMPLES 2-10

The process disclosed in Example 1 was repeated under varying reaction conditions. The results obtained are illustrated in Table II hereinbelow wherein "mol percent" means mol per 100 mols of lactam used.

TABLE II

| Example: | LiH, mol percent | 2,4,6-tri-chloro-s-triazine, mol percent | Reduced viscosity [3] | Monomer conversion, percent |
|---|---|---|---|---|
| 2 [1] | 0.36 | 0.06 | 12.8 | 90.2 |
| 3 [1] | 0.72 | 0.04 | 5.3 | 91.8 |
| 4 [1] | 0.72 | 0.08 | 6.5 | 96.4 |
| 5 [1] | 0.72 | 0.12 | ---------- | 95.8 |
| 6 [2] | 1.07 | 0.08 | [4] 8.56 | 97.2 |
| 7 [2] | 0.72 | 0.04 | 11.1 | 93.5 |
| 8 [2] | 0.84 | 0.08 | 12.4 | 97.2 |
| 9 [2] | 0.96 | 0.08 | 14.8 | 97.0 |
| 10 [3] | 1.08 | 0.08 | 8.2 | 96.3 |

[1] Polymerization conducted at 180°.
[2] Polymerization conducted at 160°.
[3] Reduced viscosities determined in 0.5% m-cresol at 25°.
[4] Reduced viscosity determined in 0.176% m-cresol at 25°.

In order to demonstrate the remarkable stability to oxidation of the polymers of the present invention, the polymer samples prepared as described in Examples 1, 5 and 8 were heated in an air circulating oven at 165° for 6 hours. For purposes of comparison, samples of poly-ε-caprolactam prepared by conventional hydrolytic polymerization, and anionic polymerization employing lithium hydride as the sole catalytic agent, were treated in the same manner. All the samples were originally white or light yellow in color. A comparison of the amount of discoloration obtained is illustrated in Table III, wherein the change of color is expressed in terms of the Gardner color standard. The samples all originally had Gardner index of about 0-2.

TABLE III

| Polymer sample: | Discoloration (increase in Gardner color index) |
|---|---|
| Example 1 | 1 |
| Example 5 | 2 |
| Example 8 | 0 |
| Hydrolytic preparation | 6 |
| LiH anionic preparation | 12 |

It is evident from the above table that considerable discolorization to a dark brown material resulted with the samples prepared by hydrolytic and lithium hydride anionic polymerization, whereas the polymer samples produced by our process were affected very slightly or not at all.

When 2,4,6-trimethoxy sym. triazine or 2,4,6-triphenoxy sym. triazine is substituted in the procedures of the above examples for cyanuric chloride the results obtained are similar to those of the above examples. Substitution of 2-chloro-4,6-diisopropylamino triazine or of cyanuric acid in said procedures gives slower polymerization but otherwise similar results to those of the above examples.

While the above describes the preferred embodiments of our invention, it must be understood that departures may be made therefrom within the scope of the specification and claim.

We claim:
1. 2,4,6-tri-(epsilon-caproimido) sym. triazine.

No references cited.

HENRY R. JILES, Primary Examiner

R. T. BOND, Assistant Examiner

U.S. Cl. X.R.

260—78, 153, 248, 249.6

PO-1050
(5/69)

UNITED STATES PATENT OFFICE
CERTIFICATE OF CORRECTION

Patent No. 3,485,822      Dated December 23, 1969

Inventor(s) Edward W. Pietrusza, Rudolph Pinter and Jack R. Pedersen

It is certified that error appears in the above-identified patent and that said Letters Patent are hereby corrected as shown below:

Column 1, Title, "Edward W. Pietrusza, Morris Township, Morris County, N.J. (36 Fairmount Ave., Morristown, N.J. 07960) and Rudolph Pinter, 24 Pine St., and Jack R. Pedersen, 25 Prospect St., both of Morristown, N.J. 07960"

should be -- Edward W. Pietrusza, Morris Township, Morris County, and Rudolph Pinter and Jack R. Pedersen, Morristown, N.J., assignors to Allied Chemical Corporation, New York, N.Y., a corporation of New York --

SIGNED AND
SEALED
JUL 14 1970

(SEAL)
Attest:

Edward M. Fletcher, Jr.
Attesting Officer

WILLIAM E. SCHUYLER, JR.
Commissioner of Patents